(12) United States Patent
Shih et al.

(10) Patent No.: US 6,273,935 B1
(45) Date of Patent: Aug. 14, 2001

(54) APPARATUS AND METHOD FOR TRAPPING A TOXIC GAS

(75) Inventors: Shih-Chang Shih, Tai-Nan; Yung-Dar Chen; Fu-Shun Lo, both of Hsin-Chu; Wen-Hsiung Wu, Tung-shih, all of (TW)

(73) Assignee: Taiwan Semiconductor Manufacturing Company, Ltd., Hsin Chu (TW)

( * ) Notice: Subject to any disclaimer, the term of this patent is extended or adjusted under 35 U.S.C. 154(b) by 0 days.

(21) Appl. No.: 09/324,431

(22) Filed: Jun. 1, 1999

(51) Int. Cl.[7] .................................................. B01D 53/04
(52) U.S. Cl. ...................... 95/8; 95/25; 95/131; 96/117; 96/131; 96/419
(58) Field of Search ............................ 95/8, 11, 25, 131; 96/108, 111, 117, 117.5, 131, 417, 419

(56) References Cited

U.S. PATENT DOCUMENTS

| | | | |
|---|---|---|---|
| 3,116,130 | * 12/1963 | Miller | 95/8 |
| 3,171,726 | * 3/1965 | Roney et al. | 96/117.5 |
| 3,966,440 | * 6/1976 | Roberts | 96/117.5 |
| 4,272,480 | * 6/1981 | Stull et al. | 96/117.5 X |
| 4,450,777 | * 5/1984 | Wolfrum et al. | 95/131 X |
| 4,557,921 | * 12/1985 | Kirsch et al. | 95/131 X |
| 4,983,190 | * 1/1991 | Verrando et al. | 95/11 |
| 5,063,035 | * 11/1991 | Leondaridis et al. | 95/131 X |
| 5,169,419 | * 12/1992 | Mori et al. | 96/117.5 |
| 5,405,431 | * 4/1995 | Eastman | 96/111 X |
| 5,853,455 | * 12/1998 | Gibson | 95/25 X |
| 6,030,437 | * 2/2000 | Gourrier et al. | 96/417 X |

FOREIGN PATENT DOCUMENTS

| | | | |
|---|---|---|---|
| 55-165124 | * 12/1980 | (JP) | 95/131 |
| 63-205120 | * 8/1988 | (JP) | 96/111 |

* cited by examiner

*Primary Examiner*—Robert H. Spitzer
(74) *Attorney, Agent, or Firm*—Tung & Associates

(57) ABSTRACT

An apparatus and a method for trapping a toxic gas contained in an exhaust gas from a process chamber are disclosed. In the apparatus, two toxic gas traps are provided which are connected in series with a toxic gas sensor provided thereinbetween and in fluid communication with the two traps. When toxic gas is detected by the toxic gas sensor, i.e., an indication that the first toxic gas trap is fully consumed, the second toxic gas trap is used to replace the first toxic gas trap, while a new toxic gas trap is installed as the second toxic gas trap. The present invention novel apparatus and method enables the full use or utilization of a toxic gas trap and results in significant cost savings. Furthermore, the present invention novel apparatus and method improves the yield of a fabrication process by reducing the machine down time since the service frequency for the chamber is reduced.

18 Claims, 1 Drawing Sheet

APPARATUS AND METHOD FOR TRAPPING A TOXIC GAS

FIELD OF THE INVENTION

The present invention generally relates to an apparatus and a method for trapping a toxic gas and more particularly, relates to an apparatus and a method for trapping a fluorine gas from an excimer laser chamber by utilizing two fluorine gas traps connected in series with a fluorine gas sensor mounted thereinbetween such that when fluorine is detected by the fluorine gas sensor, the downstream fluorine trap is used to replace the upstream fluorine trap.

BACKGROUND OF THE INVENTION

In recent years, advanced microelectronic devices are fabricated with very large scale integration (VLSI) or ultra large scale integration (ULSI) techniques such that extremely complex electrical circuits can be fabricated onto a very small chip. The large reduction in size of the microelectronic devices requires the development of new design and manufacturing technologies to accomplish the miniaturization of such semiconductor devices. One of the critical fabrication steps for the microelectronic devices is the photolithographic process in which a pattern of the circuits in a microscopic scale is transferred from a photomask onto a wafer surface such that the circuits are reproduced on the wafer.

A typical photolithographic process utilizes a step-and-repeat process to gradually transfer a mask pattern to a chip implementation on a microscopic scale. The process involves many individual steps of reductions wherein errors may be introduced into the final mask. For instance, in such a micro-lithography process, problems exist in the accurate measurement of overlay which is an indication of the degree of misalignment between successive layers of patterns on a semiconductor wafer surface and of the alignment of a mask/reticle pattern for printing such layers to preceding layers. In conducting lithography on such a microscopic scale, the capability of making an accurate measurement of overlay is a critical requirement of the process.

In a conventional method for measuring overlay and for aligning the wafers, a global alignment method and global alignment marks are frequently utilized wherein alignment marks are patterned by an independent process layer and then all the other device process layers are aligned to the alignment marks. For the device layers, the degree of overlay shift (or error) can be measured to by specifically designed measurement patterns from both successive and preceding layers formed by scribe lines for checking the overlay. For instance, the test targets can be laid out in the peripheral regions on a wafer surface. The measurements are then conducted to verify the accuracy of the circuit lay out by comparing shifts in the box center lines to a process average. With the conventional techniques, an accurate wafer dimensional quality determination cannot be made until box-in-box targets are made on an appropriate number of cells within a circuit. Furthermore, in the conventional measurement techniques, by using a stepper machine, a focal plane of the stepper is determined manually by technicians by visually reading exposed 0.6 μm focus matrix dots.

In a stepper machine, an excimer laser such as one formed by krypton/fluorine gas mixture is frequently used for triggering a 240 nm exposure light in the stepper. The KrF excimer laser is generated in a laser chamber that is filled with both the krypton gas and the fluorine gas. The laser chamber contains the gas mixture under a sufficient pressure. Laser energy is generated when electrical energy is discharged into the gas mixture in the chamber. A blower fan inside the chamber cavity circulates the laser gas mixture between each electrical discharge. The chamber is normally constructed of a specific refractory material such that the lifetime of the laser gas may be extended. A unique pre-ionization process is further utilized to allow the process to be operated at significantly reduced voltages.

A conventional excimer laser chamber for generating a laser for the stepper and its related fluorine gas treatment apparatus is shown in FIG. 1. The laser generating apparatus 10 consists of an excimer laser chamber 12 which is used for generating a laser, a fluorine trap 14 for removing fluorine from the exhaust gas from the laser chamber 12, a transparent window 16 mounted in the conduit 18 to allow visual inspection of the conduit interior, a fluorine gas sensor 20 and a gas evacuation device 22. The fluorine trap 14 is part of a gas control module (not shown) that handles all gas functions, including the removal of fluorine from the exhaust gas by the fluorine trap 14 before it exits into the atmosphere. The gas module also regulates the flow of nitrogen to various components and subsystems. The transparent window 16 allows visual inspection of the status of the fluorine trap. A laser alignment module (not shown) is further provided which emits a visible laser and provides a means for making alignments between the ultra violet laser and the stepper. The guide laser light is superimposed onto the UV beam path with a mirror mounted on the output coupler assembly.

In the conventional excimer laser chamber shown in FIG. 1, a gas mixture that contains 0.9~1.0% fluorine and 1.2~1.3% krypton in neon is normally employed. The volume of the gas mixture utilized is approximately 30 liter-ATM per fill at a delivery pressure of 440~480 kPa. Since fluorine is the most reactive element and one of the most potent oxidizers, inhalation of and skin contact with even 1% fluorine can be hazardous to human. The exhaust from the excimer laser chamber 12 must therefore be treated with an on-board physical capture device, i.e., a fluorine trap 14. In a conventional semiconductor fabrication process, the fluorine trap 14 is normally replaced after 250 laser fill cycles. It is a costly process since not only it requires significant down time of the laser chamber for the replacement, but also causes unnecessary waste of the costly fluorine trap since frequently only 60~70% of the trap capacity is consumed after 250 cycles. While window 16 is also used as an indicator, i.e., when it turns dark for the need of fluorine trap replacement, the conventional trap replacement procedure results in unnecessary down time for the process chamber and a decrease in chip yield.

It is therefore an object of the present invention to provide an apparatus for trapping a toxic gas from a laser chamber that does not have the drawbacks or shortcomings of the conventional apparatus.

It is another object of the present invention to provide an apparatus for trapping a toxic gas such as fluorine from a laser chamber that can be carried out on a minimal cost basis.

It is a further object of the present invention to provide an apparatus for trapping a toxic gas such as fluorine from a laser chamber that utilizes a double-stack fluorine trap.

It is another further object of the present invention to provide an apparatus for trapping a fluorine gas wherein two fluorine traps are connected in series with a fluorine sensor connected thereinbetween.

It is still another object of the present invention to provide an apparatus for trapping a fluorine gas wherein two fluorine traps are connected in series and the downstream trap is used to replace a consumed upstream trap.

It is yet another object of the present invention to provide a method for trapping a toxic gas by providing two toxic gas traps connected in series with a toxic gas sensor thereinbetween.

It is still another further object of the present invention to provide a method for trapping a fluorine gas by utilizing two fluorine gas traps connected in series such that when the first trap is fully consumed, it is replaced by the second trap.

It is yet another further object of the present invention to provide an apparatus for trapping fluorine gas from a laser chamber exhaust by providing two fluorine traps connected in series, a fluorine sensor thereinbetween and a gas pump for withdrawing the exhaust gas from the laser chamber.

SUMMARY OF THE INVENTION

In accordance with the present invention, an apparatus and a method for trapping a toxic gas from a process chamber are disclosed.

In a preferred embodiment, an apparatus for trapping a toxic gas is provided which includes a first toxic gas trap that has a first inlet and a first outlet, a second toxic gas trap that has a second inlet and a second outlet, a first conduit providing fluid communication between the first outlet and the second inlet, the first conduit may further include a first toxic gas sensor installed therein, and a second conduit providing fluid communication between the second outlet and a gas evacuation device for pulling a toxic gas into the first inlet.

The apparatus for trapping a toxic gas may further include a second toxic gas sensor situated in the second conduit, or an observation window in the second conduit. The first inlet of the first toxic gas trap may be connected to and in fluid communication with a laser chamber that generates a toxic gas. The first toxic gas trap and the second toxic gas trap may be interchangeable. The gas evacuation device may be a gas pump.

In the apparatus for trapping a toxic gas, the first toxic gas sensor may be connected to an alarm for alerting a machine operator when a toxic gas is detected. The first and the second toxic gas traps absorb a toxic gas by chemical reaction. The first and second toxic gas traps are fluorine gas traps.

The present invention is further directed to a method for trapping a toxic gas that can be carried out by the operating steps of providing a first toxic gas trap equipped with a first inlet and a first outlet, providing a second toxic gas trap equipped with a second inlet and a second outlet, connecting the first outlet to the second inlet by a first conduit that has a first toxic gas sensor installed therein, connecting the second outlet to a gas evacuation device by a second conduit, feeding a toxic gas into the first gas inlet, and replacing the first toxic gas trap with the second toxic gas trap when a toxic gas is detected by the first toxic gas sensor.

The method for trapping a toxic gas may further include the step of replacing the second toxic gas trap with a new third toxic gas trap. The method may further include the step of installing a second toxic gas sensor in the second conduit, or providing an observation window in the second conduit. The method may further include the step of connecting the first gas inlet in fluid communication with a laser chamber that generates a toxic gas. The gas evacuation device may be a gas pump. The method may further include the step of installing a second toxic gas sensor in the second conduit and sounding an alarm when a toxic gas is detected by the second toxic sensor.

In an alternate embodiment, an apparatus for trapping fluorine gas from an exhaust of a laser chamber is provided which includes a first fluorine trap equipped with a first inlet and a first outlet, a second fluorine trap equipped with a second inlet and a second outlet, a first conduit which provides fluid communication between the first outlet and the second inlet, the first conduit equipped with a first fluorine gas sensor, and a second conduit which provides fluid communication between the second outlet and a gas evacuation device for pulling the exhaust gas from the laser chamber into the first inlet.

The apparatus for trapping fluorine gas from an exhaust of a laser chamber may further include a second fluorine gas sensor for detecting a fluorine gas and sending an alarm signal. The first fluorine trap and the second fluorine trap may be interchangeable. The apparatus may further include an observation window installed in the second conduit.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses an apparatus and a method for trapping a toxic gas from a process chamber, for instance, trapping a fluorine gas from an excimer laser chamber utilized in a stepper machine. While an example for trapping a fluorine gas from a laser chamber is used, the present invention novel apparatus and method are in no way limited to such application.

In the apparatus for trapping a toxic gas such as fluorine, the apparatus may include a first toxic gas trap and a second toxic gas trap that are connected in series with a toxic gas sensor provided thereinbetween. A gas evacuation device such as a pump may be connected to the outlet of the second toxic gas trap such that an exhaust gas that contains the toxic gas may be pumped into the first toxic gas trap that is connected to the process chamber. An observation window may further be provided in the conduit connecting the pump and the second toxic gas trap for visual inspection of the conduit.

The present invention novel method for trapping a toxic gas utilizing the present invention apparatus can be advantageously carried out by monitoring the fluorine gas sensor that is installed between the two fluorine traps. When the sensor senses fluorine, which is an indication that the first fluorine trap is fully consumed and therefore no longer effective in reacting with fluorine (or absorbing fluorine), the operation of the laser chamber can be temporarily stopped while the second fluorine trap is used to replace the first fluorine trap. Simultaneously, a new fluorine trap may be installed as the second fluorine trap.

The present invention novel apparatus permits the fluorine traps to be utilized, i.e., to be consumed, fully before they are replaced. A significant cost saving can therefore be achieved. Furthermore, the present invention novel apparatus and method reduce the down time required for replacing the fluorine trap by reducing the frequency of replacement.

Figure 1:
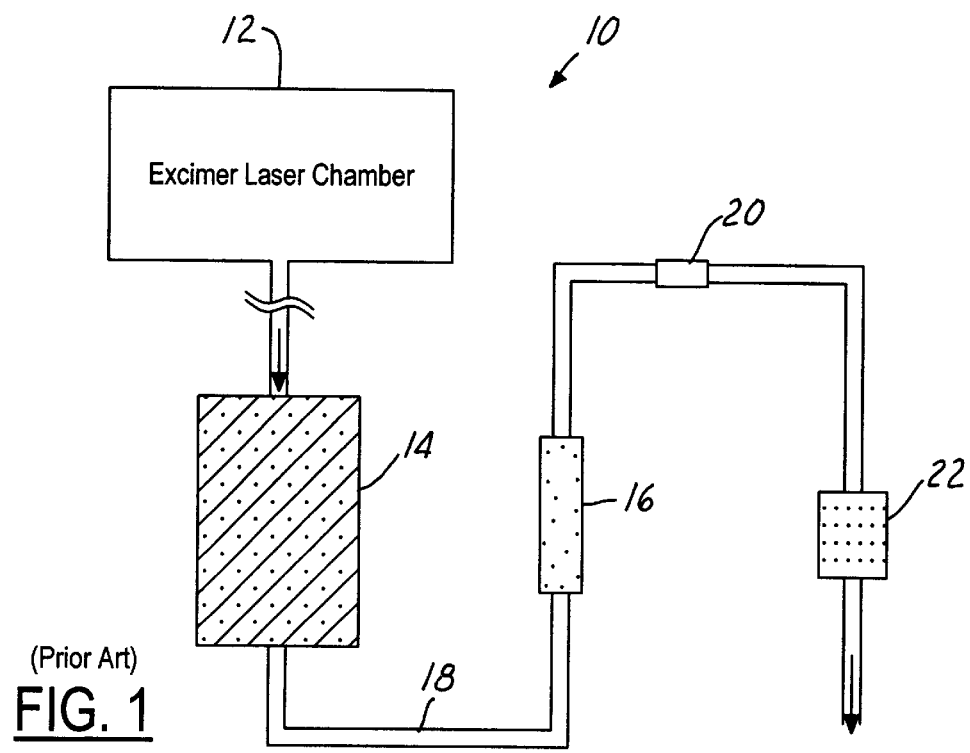
FIG. 1 is a schematic showing a conventional excimer laser chamber with an exhaust conduit connected to a fluorine trap, a fluorine detector and a pump.
Figure 2:
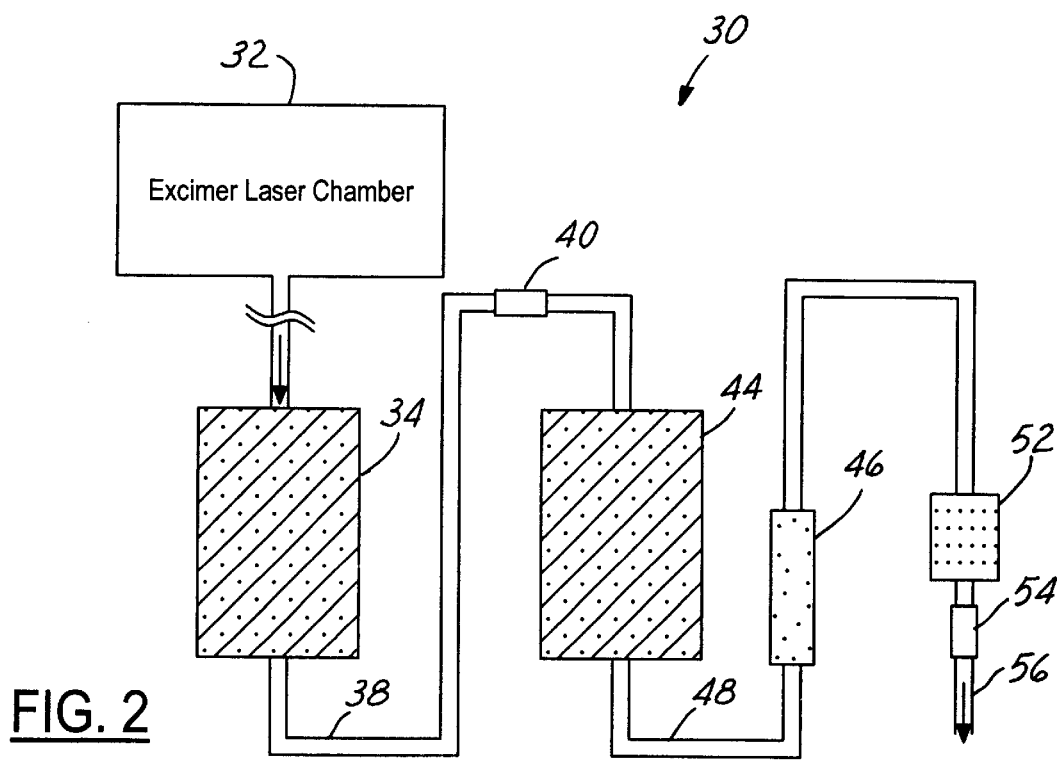
FIG. 2 is an illustration of a present invention excimer laser chamber with its exhaust flown to two fluorine traps connected in series with a fluorine sensor installed thereinbetween.

Referring now to FIG. 2, wherein a present invention apparatus 30 for removing a toxic gas is shown. The apparatus 30 consists of an excimer laser chamber 32 which has an exhaust connected to a first toxic gas trap 34. The exhaust gas, after losing its toxic gas content, enters a first conduit 38 and is detected by a toxic gas sensor 40 for any content of the toxic gas. The exhaust exiting the toxic gas sensor 40 then enters into the second toxic gas trap 44. The second toxic gas trap 44 is used to catch any toxic gas that is not consumed by the first trap 34 and is detected by the toxic gas sensor 40. As soon as any toxic gas is detected by the toxic gas sensor 40, an alarm may be triggered to alert the machine operator so that the second toxic gas trap 44 can be used to immediately replace the first toxic gas trap 34. The first toxic gas trap 34 which is fully consumed can be sent back to the factory for refurbishing and refill of fresh chemicals.

As shown in FIG. 2, an observation window 46 may be provided as an additional indication of the state of the exhaust gas in conduit 48. The exhaust gas is evacuated out of the system by pump 52 and detected by a second toxic gas sensor 54 as an added assurance that no residual toxic gas is contained in the exhaust gas leaving conduit 56 and be released into the factory exhaust system. In the event that any toxic gas is detected by the second toxic gas sensor 54, a signal may be sent to an emergency response center for immediate remedial actions.

The present invention novel apparatus and method for treating toxic gas from a process chamber have therefore been amply described in the above descriptions and in the appended drawing of FIG. 2.

While the present invention has been described in an illustrative manner, it should be understood that the terminology used is intended to be in a nature of words of description rather than of limitation.

Furthermore, while the present invention has been described in terms of a preferred and several alternate embodiments, it is to be appreciated that those skilled in the art will readily apply these teachings to other possible variations of the inventions.

The embodiment of the invention in which an exclusive property or privilege is claimed are defined as follows:

1. A method for trapping a toxic gas comprising the steps of:
   providing a first toxic gas trap equipped with a first inlet and a first outlet,
   providing a second toxic gas trap equipped with a second inlet and a second outlet,
   connecting said first outlet to said second inlet by a first conduit having a first toxic gas sensor therein,
   connecting said second outlet to a gas evacuation device by a second conduit,
   feeding a toxic gas into said first gas inlet, and
   replacing said first toxic gas trap with said second toxic gas trap when a toxic gas is detected by said first toxic gas sensor.

2. A method for trapping a toxic gas according to claim 1 further comprising the step of replacing said second toxic gas trap with a new third toxic gas trap.

3. A method for trapping a toxic gas according to claim 1 further comprising the step of installing a second toxic gas sensor in said second conduit.

4. A method for trapping a toxic gas according to claim 1 further comprising the step of providing an observation window in said second conduit.

5. A method for trapping a toxic gas according to claim 1 further comprising the step of connecting said first gas inlet in fluid communication with a laser chamber that generates the toxic gas.

6. A method for trapping a toxic gas according to claim 1, wherein said gas evacuation device comprises a gas pump.

7. A method for trapping a toxic gas according to claim 1 further comprising the step of installing a second toxic gas sensor in said second conduit and sounding an alarm when the toxic gas is detected by said second toxic gas sensor.

8. An apparatus for trapping a toxic gas comprising:
   a first toxic gas trap having a first inlet and a first outlet,
   a second toxic gas trap having a second inlet and a second outlet, said second toxic gas trap being interchangeable with said first toxic gas trap,
   a first conduit providing fluid communication between said first outlet and said second inlet, said first conduit having a first toxic gas sensor therein, and
   a second conduit providing fluid communication between said second outlet and a gas evacuation device for pulling a toxic gas into said first inlet, wherein said first toxic gas trap is replaced with said second toxic gas trap when a toxic gas is detected by said first toxic gas sensor.

9. An apparatus for trapping a toxic gas according to claim 8 further comprising a second toxic gas sensor situated in said second conduit.

10. An apparatus for trapping a toxic gas according to claim 8 further comprising an observation window in said second conduit.

11. An apparatus for trapping a toxic gas according to claim 8, wherein said first inlet of said first toxic gas trap is connected to and is in fluid communication with a laser chamber that generates a toxic gas.

12. An apparatus for trapping a toxic gas according to claim 8, wherein said gas evacuation device is a gas pump.

13. An apparatus for trapping a toxic gas according to claim 8, wherein said first toxic gas sensor is connected to an alarm for alerting a machine operator when the toxic gas is detected.

14. An apparatus for trapping a toxic gas according to claim 8, wherein said first and second toxic gas trap absorbs the toxic gas by chemical reaction.

15. An apparatus for trapping a toxic gas according to claim 8, wherein said first and second toxic gas trap are fluorine gas traps.

16. An apparatus for trapping fluorine gas from an exhaust of a laser chamber comprising:
   a first fluorine trap equipped with a first inlet and a first outlet,
   a second fluorine trap equipped with a second inlet and a second outlet, said second fluorine trap being interchangeable with said first fluorine trap, a first conduit providing fluid communication between said first outlet and said second inlet, said first conduit equipped with a first fluorine gas sensor, and a second conduit providing fluid communication between said second outlet and a gas evacuation device for pulling said exhaust gas from said laser chamber into said first inlet, wherein said first fluorine trap is replaced with said second fluorine trap when fluorine gas is detected by said first fluorine gas sensor.

17. An apparatus for trapping fluorine gas from an exhaust of a laser chamber according to claim 16 further comprising a second fluorine gas sensor for detecting the fluorine gas and sending an alarm signal.

18. An apparatus for trapping fluorine gas from an exhaust of a laser chamber according to claim 16 further comprising an observation window installed in said second conduit.

* * * * *